(12) United States Patent
Chhabra et al.

(10) Patent No.: US 10,374,805 B2
(45) Date of Patent: Aug. 6, 2019

(54) TECHNOLOGIES FOR TRUSTED I/O FOR MULTIPLE CO-EXISTING TRUSTED EXECUTION ENVIRONMENTS UNDER ISA CONTROL

(71) Applicant: Intel Corporation, Santa Clara, CA (US)

(72) Inventors: Siddhartha Chhabra, Hillsboro, OR (US); Reshma Lal, Hillsboro, OR (US); Ravi L. Sahita, Beaverton, OR (US); Reouven Elbaz, Hillsboro, OR (US); Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 14/974,948

(22) Filed: Dec. 18, 2015

(65) Prior Publication Data

US 2017/0026181 A1    Jan. 26, 2017

Related U.S. Application Data

(60) Provisional application No. 62/195,703, filed on Jul. 22, 2015, provisional application No. 62/195,148, (Continued)

(51) Int. Cl.
| | | |
|---|---|---|
| *H04L 9/32* | (2006.01) | |
| *G06F 9/455* | (2018.01) | |
| *G06F 13/28* | (2006.01) | |
| *G06F 21/53* | (2013.01) | |

(52) U.S. Cl.
CPC ........ *H04L 9/3234* (2013.01); *G06F 9/45558* (2013.01); *G06F 13/28* (2013.01);
(Continued)

(58) Field of Classification Search
CPC ... H04L 9/3234; H04L 9/45448; G06F 21/53; G06F 13/28
See application file for complete search history.

(56) References Cited

U.S. PATENT DOCUMENTS 7,636,844 B2 * 12/2009 Bajikar ................. G06F 21/606
                                                                    380/227
7,716,389 B1    5/2010 Bruce
(Continued)

FOREIGN PATENT DOCUMENTS

| EP | 2889800 | 7/2015 |
|---|---|---|
| WO | 2007-076340 | 7/2007 |
| WO | 2011/109772 | 9/2011 |

OTHER PUBLICATIONS

International Search Report for PCT/US16/038392, dated Sep. 26, 2016 (3 pages).
(Continued)

*Primary Examiner* — Khoi V Le
(74) *Attorney, Agent, or Firm* — Barnes & Thornburg LLP

(57) ABSTRACT

Technologies for secure programming of a cryptographic engine include a computing device with a cryptographic engine and one or more I/O controllers. The computing device establishes one or more trusted execution environments (TEEs). A TEE generates a request to program the cryptographic engine with respect to a DMA channel. The computing device may verify a signed manifest that indicates the TEEs permitted to program DMA channels and, if verified, determine whether the TEE is permitted to program the requested DMA channel. The computing device may record the TEE for a request to protect the DMA channel and may determine whether the programming TEE matches the recorded TEE for a request to unprotect a DMA channel. The computing device may allow the request to unprotect the
(Continued)

DMA channel if the programming TEE matches the recorded TEE. Other embodiments are described and claimed.

21 Claims, 5 Drawing Sheets

Related U.S. Application Data filed on Jul. 21, 2015, provisional application No. 62/194,763, filed on Jul. 20, 2015.

(52) U.S. Cl.
CPC .... *G06F 21/53* (2013.01); *G06F 2009/45579* (2013.01); *G06F 2009/45587* (2013.01); *G06F 2221/2149* (2013.01); *H04L 2209/127* (2013.01); *H04L 2209/26* (2013.01)

(56) References Cited

U.S. PATENT DOCUMENTS

| | | |
|---|---|---|
| 2005/0086509 A1* | 4/2005 | Ranganathan .......... G06F 21/57 726/27 |
| 2005/0120147 A1 | 6/2005 | Koyama |
| 2007/0204073 A1 | 8/2007 | Chen |
| 2008/0052532 A1* | 2/2008 | Akkar ................... G06F 9/3004 713/189 |
| 2009/0240923 A1* | 9/2009 | Covey ................. G06F 9/30167 712/220 |
| 2009/0328164 A1 | 12/2009 | Sunder |
| 2012/0047580 A1* | 2/2012 | Smith ..................... G06F 21/53 726/24 |
| 2012/0072734 A1* | 3/2012 | Wishman .............. G06F 21/572 713/189 |
| 2014/0095918 A1* | 4/2014 | Stahl .................... G06F 21/725 713/500 |
| 2014/0188732 A1 | 7/2014 | Kobres |
| 2016/0379000 A1* | 12/2016 | Carpenter ............ G06F 21/552 726/17 |

OTHER PUBLICATIONS

Written Opinion for PCT/US16/038392, dated Sep. 26, 2016 (9 pages).
Extended European search report for European patent application No. EP16828188, dated Feb. 15, 2019 (5 pages).

* cited by examiner

TECHNOLOGIES FOR TRUSTED I/O FOR MULTIPLE CO-EXISTING TRUSTED EXECUTION ENVIRONMENTS UNDER ISA CONTROL

CROSS-REFERENCE TO RELATED APPLICATIONS

The present application claims priority under 35 U.S.C. § 119(e) to U.S. Provisional Patent Application Ser. No. 62/194,763, entitled "CRYPTOGRAPHIC PROTECTION OF I/O DATA FOR DMA CAPABLE I/O CONTROLLERS," which was filed on Jul. 20, 2015, to U.S. Provisional Patent Application Ser. No. 62/195,148, entitled "CRYPTOGRAPHIC PROTECTION OF I/O DATA FOR DMA CAPABLE I/O CONTROLLERS," which was filed on Jul. 21, 2015, and to U.S. Provisional Patent Application Ser. No. 62/195,703, entitled "TECHNOLOGIES FOR TRUSTED I/O FOR MULTIPLE TRUSTED EXECUTION ENVIRONMENTS UNDER PROCESSOR INSTRUCTION SET CONTROL," which was filed on Jul. 22, 2015.

BACKGROUND

Typical computing devices may rely on software agents, such as anti-malware agents, for security. However, it is difficult to keep up with the increasing number of malware attacks on users' devices. To combat the malware threat, there is a trend to protect security sensitive software by running it inside a Trusted Execution Environment (TEE). TEEs provide a sterile environment that can protect secrets even when other parts of the system are compromised. Examples of TEEs include Intel® Software Guard Extensions (Intel® SGX), secure virtual machines (VMs), and a converged security engine (CSE). The TEE, while useful to protect secrets within the TEE, may not protect I/O data such as user and sensor data that is communicated into and/or out of the secure "container." The security requirements for trusted I/O vary per use case and device, and involve flavors and combinations of confidentiality, integrity, liveliness, and replay protection.

Certain systems may provide a trusted execution environment using a virtual machine monitor (VMM), hypervisor, or other virtualization technology. A virtualization-based trusted execution environment may be known as a VMM TEE. In particular, certain versions of the Microsoft® Windows™ operating system may include virtualization-based environments. Some computing devices may include multiple, mutually distrusting trusted execution environments. In particular, many computing devices may include an SGX TEE and a VMM TEE.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
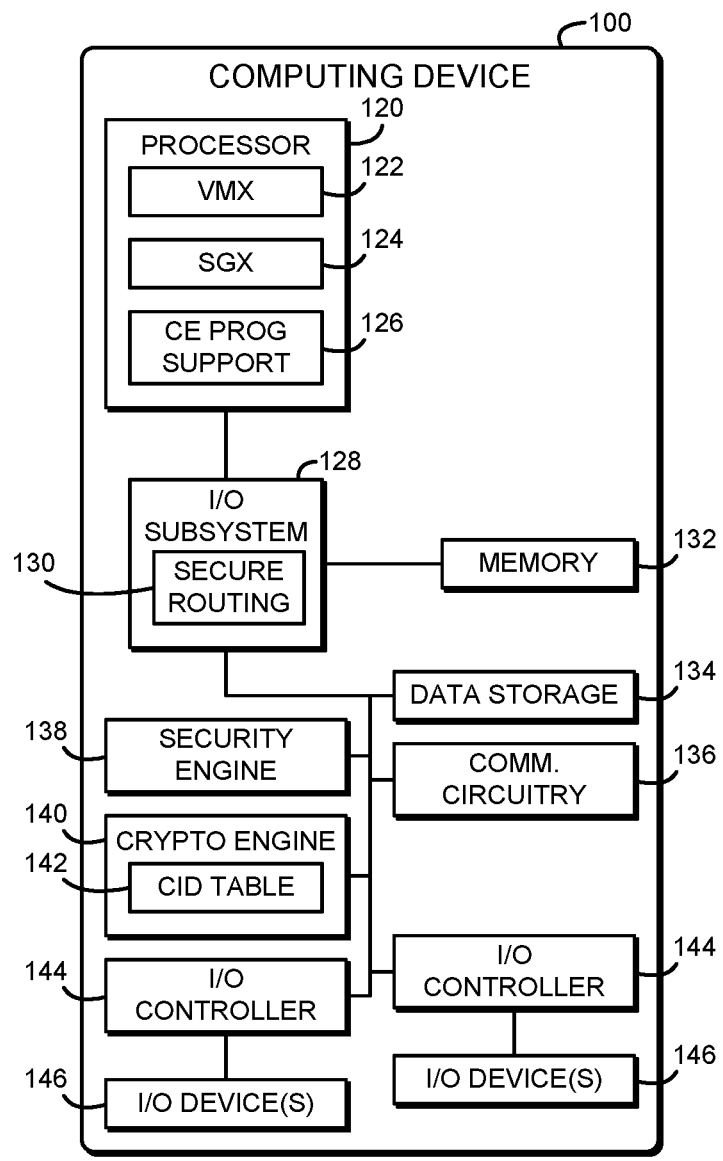
FIG. 1 is a simplified block diagram of at least one embodiment of a computing device for secure programming of a central cryptographic engine.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for secure I/O includes, among other components, a processor 120, main memory 132, a hardware cryptographic engine 140, and one or more I/O controllers 144 in communication with one or more I/O devices 146. In use, the cryptographic engine 140 provides on-the-fly encryption and decryption of data transferred via direct memory access operations (DMAed) between the platform I/O controllers 144 and the memory 132. Each DMA transaction is tagged with a channel ID (CID) representing a flow of data associated with a particular I/O device 146 or set of I/O devices 146. The cryptographic engine 140 uses the CID to reliably identify transactions that must be protected, retrieve the corresponding encryption keys, and perform appropriate cryptographic operations on the DMA data. The cryptographic engine 140 is programmed, for example with channel information and associated encryption keys, by trusted software using one or more specialized instructions of the processor 120. The computing device 100 also establishes multiple, mutually distrusting, trusted execution environments, such as a secure enclave and a VMM. In some embodiments, the computing device 100 may permit each TEE to control one or more DMA channels, based on a system manifest. Additionally or alternatively, in some embodiments the computing device 100 may track the ownership of each DMA channel and permit only the TEE that owns a particular DMA channel to bring the DMA channel out of secure. Thus, the computing device 100 may allow multiple TEEs to program the cryptographic engine 140 while preventing untrusted software (including a different TEE) from subverting the programming of the cryptographic engine 140. Accordingly, the computing device 100 may make the hardware trusted I/O capability of the central cryptographic engine 140 usable for any of the TEEs of the computing device 100. Additionally, in the computing device 100, each TEE is outside of the trusted code base (TCB) of the other TEEs on the computing device 100.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 128, a memory 132, a data storage device 134, and communication circuitry 136. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 may include hardware virtualization support 122, secure enclave support 124, and crypto engine programming support 126.

The hardware virtualization support 122 supports virtualized execution of operating systems, applications, and other software by the computing device 100. The hardware virtualization support 122 may include virtual machine extensions (VMX) support by providing two modes of execution: VMX-root mode and VMX non-root mode. The VMX-root mode allows executing software to have broad control of the computing device 100 and its hardware resources. A hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The hardware virtualization support 122 may also support extended page tables (EPT), which may be embodied as hardware-assisted second-level page address translation. The hardware virtualization support 122 may be embodied as, for example, Intel® VT-x technology.

The secure enclave support 124 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 132. The secure enclave support 124 may be embodied as a set of processor instruction extensions that allows the processor 120 to establish one or more secure enclaves in the memory 132. For example, the secure enclave support 124 may be embodied as Intel® Software Guard Extensions (SGX) technology.

The crypto engine programming support 126 allows the processor 120 to program the cryptographic engine 140 to provide cryptographic protection of I/O data. In particular, the processor 120 may enable or disable encryption for certain I/O channels, and may securely provide encryption keys to the cryptographic engine 140. The crypto engine programming support 126 may be embodied as one or more specialized processor instructions (e.g., the instructions EBINDTIO, UNWRAP, or other instructions) and associated hardware, microcode, firmware, or other components of the processor 120. The crypto engine programming support 126 of the processor 120 may allow trusted software to program the cryptographic engine 140 while preventing untrusted software from programming the cryptographic engine 140.

The memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory 132 is communicatively coupled to the processor 120 via the I/O subsystem 128, which may be embodied as circuitry and/or components to facilitate input/output operations with the processor 120, the memory 132, and other components of the computing device 100. For example, the I/O subsystem 128 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. The I/O subsystem 128 may further include secure routing support 130. The secure routing support 130 includes hardware support to ensure I/O data cannot be misrouted in the fabric 128 under the influence of rogue software. The secure routing support 130 may be used with the cryptographic engine 140 to provide cryptographic protection of I/O data. In some embodiments, the I/O subsystem 128 may form a portion of a system-on-a-chip (SoC) and be incorporated, along with the processor 120, the memory 132, and other components of the computing device 100, on a single integrated circuit chip.

The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may be used to store the contents of one or more secure enclaves. When stored by the data storage device 134, the contents of the secure enclave may be encrypted to prevent unauthorized access.

The communication circuitry 136 of the computing device 100 may be embodied as any communication circuit, device, or collection thereof, capable of enabling communications between the computing device 100 and other remote devices over a network. The communication circuitry 136 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may include a security engine 138, which may be embodied as any hardware component(s) or circuitry capable of providing security-related services to the computing device 100. In particular, the security engine 138 may include a microprocessor, microcontroller, or other embedded controller capable of executing firmware and/or other code independently and securely from the processor 120. Thus, the security engine 138 may be used to establish a trusted execution environment separate from code executed by the processor 120. The security engine 138 may communicate with the processor 120 and/or other components of the computing device 100 over a dedicated bus, such as a host embedded controller interface (HECI). The security engine 138 may also provide remote configuration, control, or management of the computing device 100. In the illustrative embodiment, the security engine 138 is embodied as a converged security and manageability engine (CSME) incorporated in a system-on-a-chip (SoC) of the computing device 100. In some embodiments, the security engine 138 may be embodied as a manageability engine, an out-of-band processor, a Trusted Platform Module (TPM), or other security engine device or collection of devices. Further, in some embodiments, the security engine 138 is also capable of communicating using the communication circuitry 136 or a dedicated communication circuit independently of the state of the computing device 100 (e.g., independently of the state of the main processor 120), also known as "out-of-band" communication.

The cryptographic engine 140 may be embodied as any microcontroller, microprocessor, functional block, logic, or other circuit or collection of circuits capable of performing the functions described herein. The cryptographic engine 140 may encrypt and/or decrypt I/O data read or written by the I/O controllers 144 in one or more direct memory access (DMA) operations to the memory 132. The cryptographic engine 140 includes an internal channel identifier (CID) table 142, which the cryptographic engine 140 uses to dynamically identify DMA channel(s) to be protected. The CID table 142 may be controlled and/or programmed by trusted software, for example using the crypto engine programming support 126 of the processor 120. The encryption keys and/or other secret information of the CID table 142 are not available to untrusted software. In some embodiments, the cryptographic engine 140 may be incorporated along with the I/O subsystem 128 and/or the processor 120 in a system-on-a-chip (SoC) of the computing device 100.

Similarly, the I/O controllers 144 may be embodied as any embedded controller, microcontroller, microprocessor, functional block, logic, or other circuit or collection of circuits capable of performing the functions described herein. In some embodiments, one or more of the I/O controllers 144 may be embedded in another component of the computing device 100 such as the I/O subsystem 128 and/or the processor 120. Additionally or alternatively, one or more of the I/O controllers 144 may be connected to the I/O subsystem 128 and/or the processor 120 via an expansion bus such as PCI Express (PCIe) or other I/O connection. As further described below, the I/O controllers 144 communicate with one or more I/O devices 146, for example over a peripheral communications bus (e.g., USB, Bluetooth, etc.). The I/O devices 146 may be embodied as any I/O device, such as human interface devices, keyboards, mice, touch screens, microphones, cameras, and other input devices, as well as displays and other output devices. As described above, the I/O controllers 144 and associated DMA channels (which correspond to attached I/O devices 146) are uniquely identified using identifiers called channel identifiers (CIDs). Each I/O controller 144 may assert an appropriate CID with every DMA transaction, for example as part of a transaction layer packet (TLP) prefix, to uniquely identify the source of the DMA transaction and provide liveness protections. The CID also enables the isolation of I/O from different devices 146.

In use, the cryptographic engine 140 snoops all DMA transactions generated by the I/O controllers 144 to the memory 132. On each transaction to or from a device 146 capable of participating in trusted I/O, the cryptographic engine 140 references the CID table 142 to find the CID corresponding to the DMA channel in the CID table 142. A match indicates that the channel is currently protected and that the cryptographic engine 140 should use the channel key associated with the channel to protect the data written to and/or the data read from memory 132 (depending on the direction of the channel).

Figure 2:
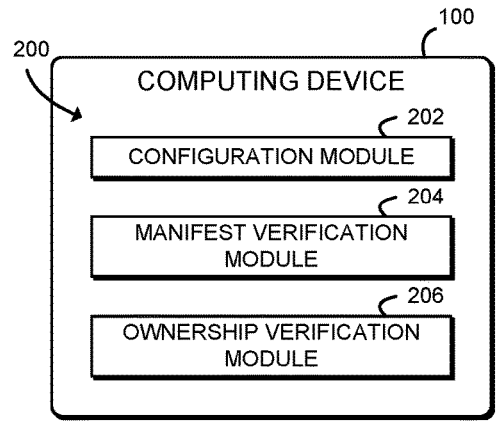
FIG. 2 is a simplified block diagram of at least one embodiment of an environment that may be established by the computing device of FIG. 1

Referring now to FIG. 2, in an illustrative embodiment, the computing device 100 establishes an environment 200 during operation. The illustrative environment 200 includes a configuration module 202, a manifest verification module 204, and an ownership verification module 206. The various modules of the environment 200 may be embodied as hardware, firmware, microcode, software, or a combination thereof. As such, in some embodiments, one or more of the modules of the environment 200 may be embodied as circuitry or collection of electrical devices (e.g., configuration circuitry 202, manifest verification circuitry 204, and/or ownership verification circuitry 206). It should be appreciated that, in such embodiments, one or more of the configuration circuitry 202, the manifest verification circuitry 204, and/or the ownership verification circuitry 206 may form a portion of one or more of the processor 120, the I/O subsystem 128, the cryptographic engine 140, and/or other components of the computing device 100. Additionally, in some embodiments, one or more of the illustrative modules may form a portion of another module and/or one or more of the illustrative modules may be independent of one another.

The configuration module 202 is configured to request, by a trusted execution environment of the computing device 100, to program the cryptographic engine 140 with respect to a direct memory access (DMA) channel (e.g., to protect the DMA channel or to unprotect the DMA channel). The trusted execution environment may be embodied as, for example, a secure enclave established with the secure enclave support 124 of the processor 120, or a virtual machine monitor (VMM) of the computing device 100. The configuration module 202 may be further configured to securely provision a signed manifest to the computing device 100 that is indicative of one or more trusted execution environments that are permitted to program DMA channels. In some embodiments, the configuration module 202 may be configured to program an address of the signed manifest to the cryptographic engine 140.

The manifest verification module 204 is configured to verify the signed manifest of the computing device 100 in response to a request to program the cryptographic engine 140. The manifest verification module 204 is further configured to determine, if the signed manifest is verified, whether the trusted execution environment that originated the programming request is permitted to program the requested DMA channel based on the signed manifest, and to program the requested DMA channel if the trusted execution environment is permitted. The manifest verification module 204 may be configured to drop the request to program the cryptographic engine 140 if the trusted execution environment is not permitted to program the DMA channel.

The ownership verification module 206 is configured to determine whether the request to program the cryptographic engine 140 is a request to program the DMA channel to secure or a request to program the DMA channel out of secure. The ownership verification module 206 is configured to record the identity of the programming trusted execution environment for a request to program the DMA channel to secure. The ownership verification module 206 is configured to determine whether the programming trusted execution environment matches the recorded trusted execution environment for a request to program the DMA channel out of secure. The ownership verification module 206 is configured to allow the request to program the cryptographic engine 140 if the programming trusted execution environment matches the recorded trusted execution environment, and to drop the request to program the cryptographic engine 140 if the programming trusted execution environment does not match the recorded trusted execution environment.

Figure 3:
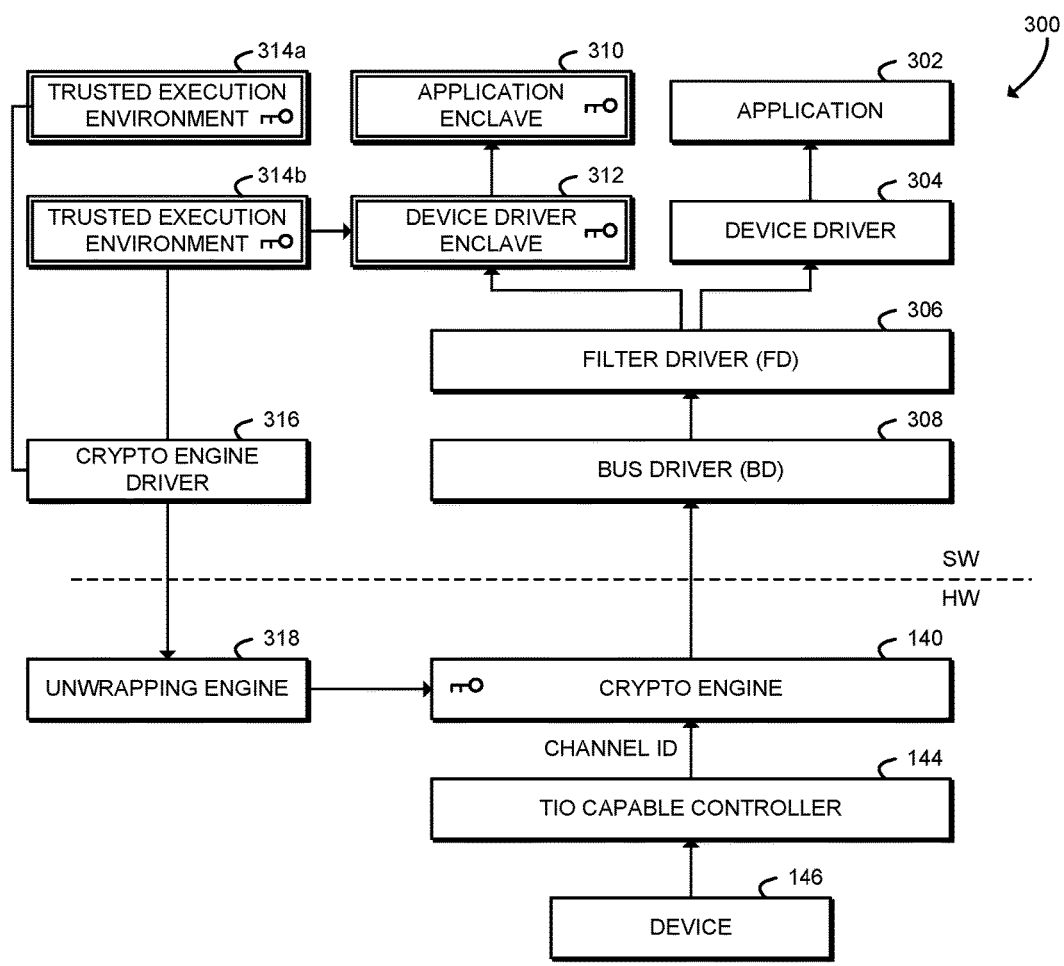
FIG. 3 is a simplified block diagram of at least one embodiment of a system architecture that may be established by the computing device of FIGS. 1-3.

Referring now to FIG. 3, diagram 300 illustrates a system architecture that may be established by the computing device 100. The system architecture may include an untrusted I/O stack including an application 302, a device driver 304, a filter driver 306, and a bus driver 308. The untrusted I/O stack may receive unprotected (i.e., plaintext) I/O data from the I/O controllers 144 via the cryptographic engine 140 and process the I/O data as normal. The system architecture may also include a trusted I/O stack including an application enclave 310 and a device driver enclave (DDE) 312. Each of the enclaves 310, 312 may be established using the secure enclave support 124 of the processor 120 and thus may be trusted. As shown, each of the enclaves 310, 312 may be provisioned with encryption keys associated with one or more DMA channels. Thus, the application enclave 310 and/or the DDE 312 may securely decrypt and process secure I/O data generated from the I/O devices 146 via the cryptographic engine 140. As shown, the secure enclave 310, 312 may receive secure I/O data via parts of the untrusted I/O stack, such as the bus driver 308 and/or the filter driver 306. In particular, I/O control and routing may be performed by the untrusted I/O stack, and because the payload of the secure I/O data is encrypted, the secure I/O data remains protected. Accordingly, the untrusted I/O stack need not be included in the TCB of the computing device 100. In some embodiments, the untrusted I/O stack, including the filter driver 306, the bus driver 308, and/or other untrusted I/O components may be re-used or otherwise shared with an ordinary operating system of the computing device 100.

As shown, the system architecture 300 further includes one or more trusted execution environments 314, a crypto engine driver 316, and an unwrapping engine 318, which may be used to program the cryptographic engine 140. Each of the trusted execution environments 314 may be embodied as trusted code that maintains or otherwise has access to encryption keys associated with one or more DMA channels. Each trusted execution environment 314 is mutually untrusted by the other trusted execution environments 314; that is, the each trusted execution environment 314 is outside of the trusted code base of the other trusted execution environments 314. For example, the illustrative embodiment includes two trusted execution environments 314a, 314b. The trusted execution environment 314a may be embodied as a virtual machine monitor, hypervisor, or other system management code protected by the virtualization support 122 of the processor 120. The trusted execution environment 314b may be embodied as a secure enclave, that is, as user-level (e.g., ring-3) code protected with the secure enclave support 124 of the processor 120. As described further below, the trusted execution environments 314 may provision the trusted I/O stack with encryption keys and/or program the cryptographic engine 140 using the crypto engine programming support 126 of the processor 120. In some embodiments, the trusted execution environments 314 may also field channel programming requests from trusted applications. In particular, a trusted execution environment 314 may execute one or more specialized processor instruction to prepare a binary blob including wrapped channel programming information, including wrapped encryption keys that may be used to program the cryptographic engine 140.

The trusted execution environment 314 may provide the binary blob to the crypto engine driver 316, which may be embodied as a kernel-level untrusted software component. The crypto engine driver 316 provides the binary blob to the unwrapping engine 318, which may unwrap and verify the binary blob and, if verified, program the channel programming information to the cryptographic engine 140. Thus, the crypto engine driver 316 may allow an operating system, VMM, or other control software of the computing device 100 to manage programming of the cryptographic engine 140 without requiring the operating system to have access to the plaintext encryption keys for the DMA channels. In the illustrative embodiment, the unwrapping engine 318 is provided by hardware and/or microcode resources of the processor 120; however, in some embodiments the functions of the unwrapping engine 318 may be performed by the cryptographic engine 140 or other components of the computing device 100.

Figure 4:
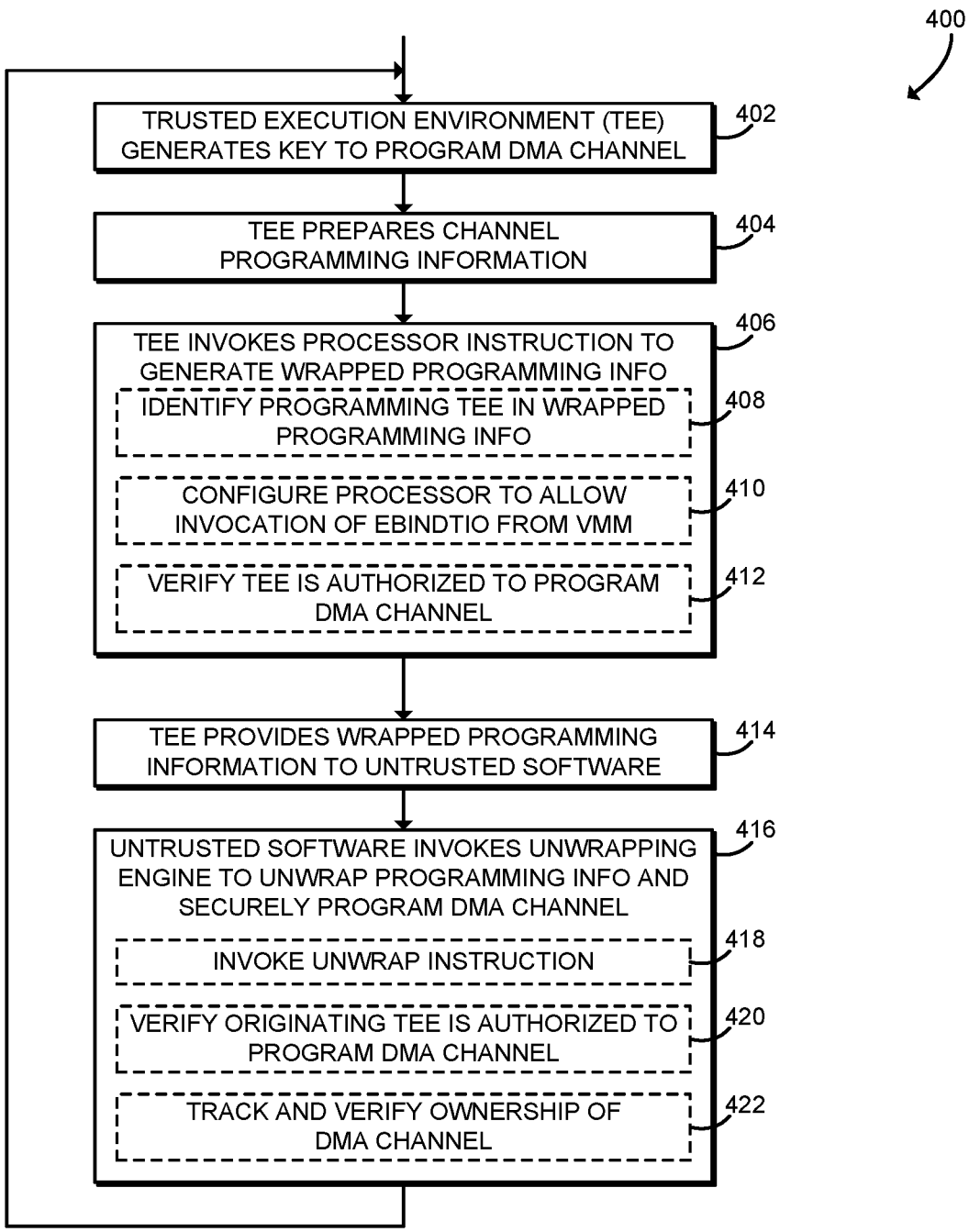
FIG. 4 is a simplified flow diagram of at least one embodiment of a method for secure programming of a central cryptographic engine that may be executed by the computing device of FIGS. 1-2.

Referring now to FIG. 4, in use, the computing device 100 may execute a method 400 for secure programming of the cryptographic engine 140. The method 400 may be executed by hardware, firmware, processor microcode, software, or other execution resources of the computing device 100. The method 400 begins with block 402, in which a trusted execution environment (TEE) 314 generates a key to program the DMA channel. The TEE 314 may be embodied as any trusted component of the computing device 100, such as a secure enclave (e.g., a crypto engine enclave (CEE) or other secure enclave), a virtual machine monitor or hypervisor, or other trusted component. The key may include a channel key used to protect I/O data transmitted over the DMA channel. Therefore, the TEE 314 may also provide the channel key to the application enclave 310, device driver enclave 312, and/or other trusted components of the computing device 100 that may access the protected I/O data. The TEE 314 does not provide the channel key to other TEEs 314. For example, a secure enclave TEE 314 may not provide the key to a VMM of the computing device 100.

In block 404, the TEE 314 prepares channel programming information to be used to program the DMA channel. The channel programming information may include the encryption key as determined in block 402 as well as other programming information such as the channel identifier (CID) of the DMA channel to be programmed, a programming command, a random nonce that may be used for authentication and replay protection, and other programming information. The CID may be embodied as an identifier that uniquely identifies a particular I/O device 146 connected to an I/O controller 144 of the computing device 100. For example, the CID may include a controller identifier field that identifies the I/O controller 144 and a device number field that identifies the I/O device 146. To prepare the programming information, the TEE 314 may, for example, allocate a structure in memory to store the programming information, also called a "binary blob." In some embodiments, the programming information may be stored in a structure known as a BIND_STRUCT, which may include fields as described below in Table 1.

TABLE 1

Bind key structure (BIND_STRUCT).

| Name of Offset | Off-set | Size (B) | Description | Set by |
|---|---|---|---|---|
| BTID | 0 | 4 | Target device | Software |
| BTSVN | 4 | 4 | Target security version number | Software |
| BTDATA | 8 | 24 | Target specific data (including, e.g., CID) | Software |
| TKEY | 32 | 16 | Channel Key for the target | Software |
| NONCE | 48 | 8 | Nonce for authenticated responses | Software |
| SEQID | 56 | 8 | Seed for generating initialization vector (IV) | Hardware |
| WRAPPING_TEE | 64 | 4 | TEE generating the wrapped channel information. (0: SGX, 1: VMM) | Hardware |
| MAC | 68 | 16 | MAC on encrypted keys, policy, target ID, SVN, BTDATA, NONCE, SEQID, and WRAPPING_TEE | Hardware |
| RSVD | 84 | 44 | Reserved | Hardware |

As shown, the BIND_STRUCT structure may include fields that are set by hardware of the processor 120, including a sequence number (SEQID), a message authentication code (MAC), and a WRAPPING_TEE field. The WRAPPING_TEE field may be set by the microcode of the processor 120 to indicate the invoking TEE 314. This field is only available to be set by hardware to allow the invoking TEE 314 to be communicated securely to the cryptographic engine 140. In addition to populating the WRAPPING_TEE field, the microcode of the processor 120 may include this field in the MAC computation to ensure that untrusted software cannot modify this field without detection. Generation of those fields by the processor 120 is described further below. In the illustrative embodiment, the WRAPPING_TEE field supports identifying one of two TEEs 314 (illustratively, an Intel® SGX secure enclave or a VMM). However, it should be understood that in some embodiments the WRAPPING_TEE field may be expanded to support additional TEEs 314.

Still referring to FIG. 4, in block 406, the TEE 314 invokes a processor instruction of the processor 120 to generate wrapped programming information. For example, the TEE 314 may invoke an EBINDTIO instruction and/or a BINDTIO instruction to generate the wrapped programming information. The TEE 314 may pass the BIND_STRUCT including the channel programming as a parameter to the processor instruction. The processor 120 encrypts the key of the channel programming information to generate an encrypted key. The processor 120 may encrypt the key using a key wrapping key (KWK) known only to the processor 120 and the unwrapping engine 318 (which may be embodied as the processor 120 and/or the cryptographic engine 140). The processor 120 may generate and include a sequence number in the wrapped programming information for replay protection and the processor 120 may generate a MAC over the channel programming information for integrity protection.

In some embodiments, in block 408, the processor 120 may identify the programming TEE 314 in the wrapped programming information. For example, as described above in connection with Table 1, the processor 120 may set a bit in the wrapped programming information to indicate whether the invoking TEE 314 is a VMM or a secure enclave. The processor 120 may use any appropriate technique to determine the identity of the invoking TEE 314. For example, the processor 120 may determine whether the processor 120 is currently executing in a secure enclave, or the processor 120 may determine whether the processor 120 is executing in VMX-root mode. The processor 120 may modify the BIND_STRUCT to contain the wrapped programming information. The processor 120 may generate the MAC over the wrapping TEE bit in order to integrity-protect the identification of the invoking TEE 314.

In some embodiments, in block 410 the computing device 100 may configure the processor 120 to allow invocation of the EBINDTIO instruction from a virtual machine monitor (VMM) or other TEE 314 that is not a secure enclave. For example, the processor 120 may by default disallow execution of the EBINDTIO, EBIND, or similar instructions from outside of a secure enclave. In some embodiments, the processor 120 may establish a model-specific register (MSR) known as IA32_EBIND_VMM_ENABLE, which may be used by the BIOS (or other platform firmware) to indicate that EBINDTIO is allowed to be executed from within a VMM. The processor 120, during execution of the EBINDTIO or EBIND instruction, may check if the instruction is executed from inside a secure enclave or a VMM and may allow a programming attempt from a VMM to succeed only if the IA32_EBIND_VMM_ENABLE MSR is set appropriately by the firmware. Although illustrated as being configured during execution of the method 400, it should be understood that in some embodiments, the processor 120 may be configured at a different time, for example during execution of a pre-boot firmware environment.

In some embodiments, in block 412, the computing device 100 may verify that the programming TEE 314 is authorized to program the DMA channel associated with the programming information. In particular, the computing device 100 may determine whether the TEE 314 has been authorized by a system manifest that has been securely provisioned to the computing device 100. The system manifest may describe the separate sets of devices that may be controlled by each TEE 314. One potential embodiment of a method for verifying that the programming TEE 314 is authorized to program the DMA channel is described below in connection with FIG. 5.

After generating the wrapped programming information, in block 414 the TEE 314 provides the wrapped programming information to untrusted software of the computing device 100, such as the crypto engine driver 316. Because the wrapped programming information has been encrypted and bound to the unwrapping engine 318, sensitive data in the channel programming information (e.g., the channel programming key) may not be accessed by the untrusted software. The untrusted software may inspect unprotected fields of the wrapped programming information (e.g., the BTDATA field) to determine whether to allow the programming attempt. Thus, kernel-mode software such as the crypto engine driver 316 may manage programming of the cryptographic engine 140 without being trusted or otherwise capable of accessing the protected I/O data.

In block 416, the untrusted software (e.g., the crypto engine driver 316) invokes the unwrapping engine 318 to unwrap the programming information and securely program the DMA channel to the cryptographic engine 140. The unwrapping engine 318 may copy the channel programming information into an appropriate entry of the CID table 142 of the cryptographic engine 140. In some embodiments, in block 418, the crypto engine driver 316 may invoke a processor instruction such as an UNWRAP instruction that causes the unwrapping engine 318 (e.g., the processor 120 and/or the cryptographic engine 140) to decrypt the channel programming key, verify the channel programming information, or otherwise program the DMA channel. The UNWRAP instruction may be embodied as a kernel-level (e.g., ring 0) instruction. In some embodiments, the UNWRAP instruction may generate a virtual machine exit (VMExit), allowing a VMM and/or hypervisor to manage virtualization of the UNWRAP instruction. By allowing the VMM to manage programming of the cryptographic engine 140, the UNWRAP instruction allows the most-privileged component of the computing device 100, e.g., the VMM, to have final control over the use of DMA channel resources. Thus, the UNWRAP instruction may prevent privilege inversion, for example by allowing the VMM to determine whether to allow a user-level secure enclave 314 to have secure access to a DMA channel, without exposing secrets of the secure enclave 314 to the VMM.

In some embodiments, in block 420 the computing device 100 may verify that the programming TEE 314 is authorized to program the DMA channel associated with the programming information. In particular, the computing device 100 may determine whether the TEE 314 has been authorized by a system manifest that has been securely provisioned to the computing device 100. One potential embodiment of a method for verifying that the programming TEE 314 is authorized to program the DMA channel is described below in connection with FIG. 5. Additionally or alternatively, in some embodiments the computing device 100 may track and verify ownership of the programmed DMA channel In particular, the computing device 100 may record the identity of the programming TEE 314 when programming a DMA channel into secure and may verify that the same TEE 314 generates the request to program the DMA channel out of secure. One potential embodiment of a method for verifying ownership of the DMA channels is described below in connection with FIG. 6.

After programming the cryptographic engine 140, the cryptographic engine 140 may generate an authenticated response that may be used by the TEE 314 to verify that channel programming was successful. After programming, the method 400 loops back to block 402, in which one or more of the TEEs 314 may generate additional programming requests.

Figure 5:
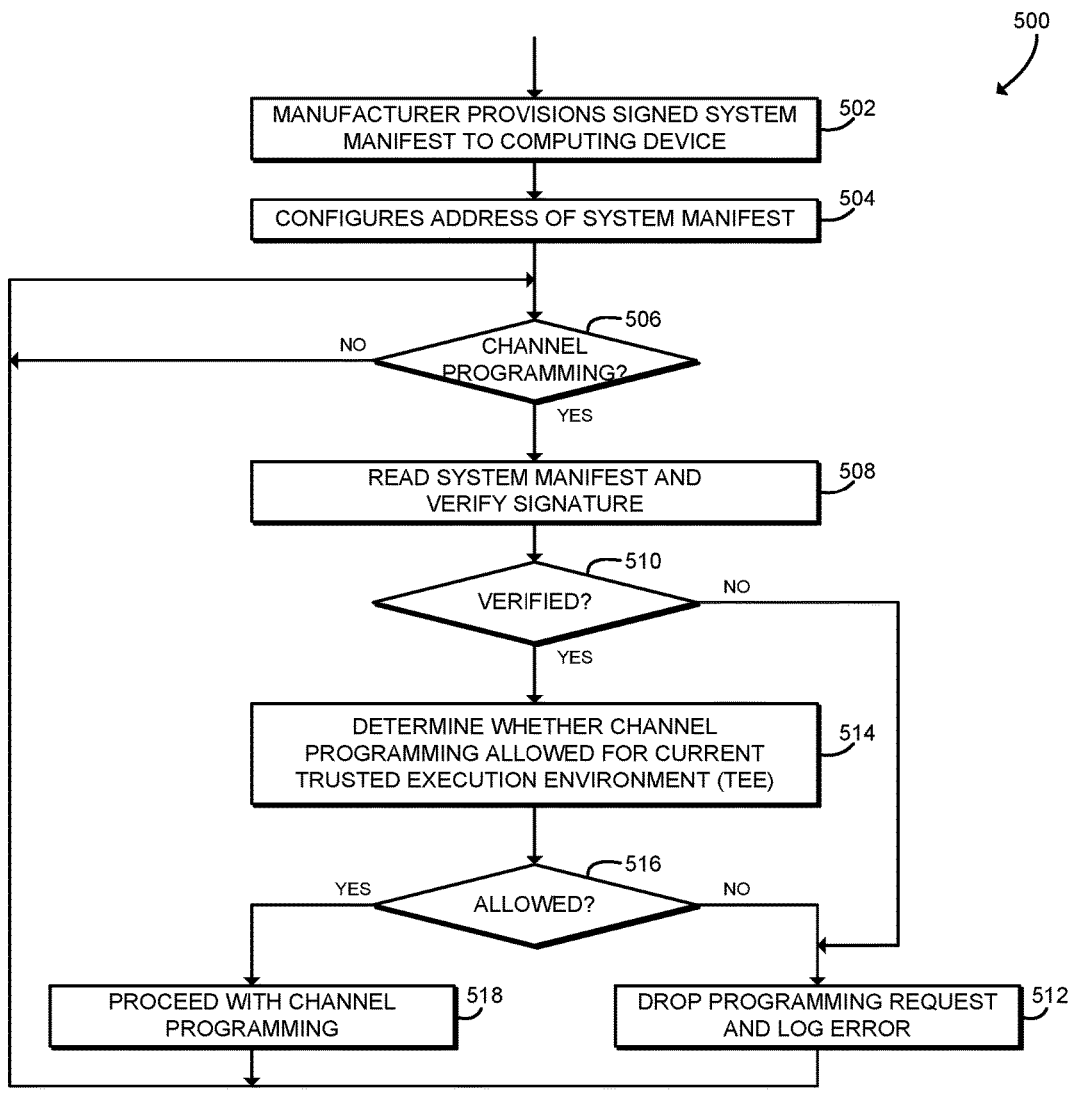
FIG. 5 is a simplified flow diagram of at least one embodiment of a method for manifest checking that may be executed by the computing device of FIGS. 1-2.

Referring now to FIG. 5, in use, the computing device 100 may execute a method 500 for system manifest checking. The method 500 may be executed by hardware, firmware, processor microcode, software, or other execution resources of the computing device 100. For example, in some embodiments, the method 500 may be executed by microcode of the processor 120 in response to invocation of the EBINDTIO instruction as described above in connection with block 412 of FIG. 4 and/or in response to invocation of the UNWRAP instruction as described above in connection with block 420 of FIG. 4. Additionally or alternatively, in some embodiments the method 500 may be executed by the cryptographic engine 140 in response to a programming attempt as described above in connection with block 420 of FIG. 4.

The method 500 begins with block 502, in which a device manufacturer or other trusted entity provisions a signed system manifest to the computing device 100. The system manifest is signed, for example with the manufacturer's private key, to allow the computing device 100 to verify the system manifest and detect attempts to modify the system manifest. The manifest may include a list of I/O devices 146 (in the form of channel IDs) and the associated TEE 314 allowed to control the I/O device 146. For example, in some embodiments biometric sensor devices 146 may be controlled by a virtual machine monitor (VMM) of the computing device 100 alone, allowing the VMM to use the biometric sensor devices 146 for secure user authentication and login. The system manifest may be provisioned to the computing device 100 using any secure provisioning technique. Additionally, although illustrated as occurring during execution of the method 500, the manifest may be provisioned at any appropriate time, for example during manufacture, integration, and/or initial configuration of the computing device 100.

In block 504, the computing device 100 configures an address of the system manifest. The computing device 100 may configure the address of the system manifest so that it is available to the component of the computing device 100 responsible for reading and/or verifying the manifest, such as the cryptographic engine 140 or the processor 120. For example, platform firmware of the computing device 100 may program the address of the system manifest to the cryptographic engine 140 during execution of a pre-boot firmware environment. The address may point to any appropriate storage location of the system manifest, such as a firmware reserved portion of the memory 132, a firmware volume of the data storage device 134, and/or other storage location. Although illustrated as occurring during execution of the method 500, the address of the manifest may be programmed at any appropriate time, for example during boot the computing device 100.

In block 506, the computing device 100 determines whether DMA channel programming has been attempted. For example, the computing device 100 may determine whether a TEE 314 has requested generation of wrapped programming information as described above in connection with block 406 of FIG. 4. As another example, the computing device 100 may determine whether untrusted software has requested unwrapping and/or programming of the programming information as described above in connection with block 416 of FIG. 4. If a channel programming attempt is not detected, the method 500 loops back to block 506 to continue monitoring for channel programming attempts. If a channel programming attempt is detected, the method 500 advances to block 508.

In block 508, the computing device 100 reads the system manifest and verifies the signature of the manifest. To verify the signature, the computing device 100 may use any cryptographic technique to verify that the manifest has not been modified. For example, the computing device 100 may verify the signature using a public key of the manufacturer of the computing device 100. The public key may be embedded in the computing device 100 during manufacturing, for example by burning the public key into a number of fuses that may be pulled by the cryptographic engine 140 during initialization and used subsequently for verification. Additionally or alternatively, in some embodiments, the cryptographic engine 140 may be hardcoded with the public key of a certificate authority (CA) and may request the CA to send the signed public key of the manufacturer, which the cryptographic engine 140 can then verify and retrieve the public key of the manufacturer. As described above, verification of the signed manifest may be performed by the cryptographic engine 140 and/or may be offloaded to the processor 120. For example, verification of the signed manifest may be performed by microcode of the processor 120 in response to invocation of the EBINDTIO or UNWRAP instructions.

In block 510, the computing device 100 determines whether the system manifest was successfully verified. If not, the method 500 advances to block 512, in which the computing device 100 drops the DMA channel programming request and logs an error. After dropping the programming request, the state of the associated DMA channel may remain unchanged. After dropping the programming request, the method 500 loops back to block 506, in which the computing device 100 monitors for further channel programming requests.

Referring back to block 510, if the system manifest is verified, the method 500 advances to block 514, in which the computing device 100 determines whether DMA channel programming is allowed for the current TEE 314. For example, the computing device 100 may search the system manifest by CID for the requested DMA channel and determine whether the current TEE 314 is allowed to program that DMA channel. The computing device 100 may use any appropriate technique to determine the identity of the current TEE 314. For example, the processor 120 may identify the current TEE 314 by determining whether the processor 120 is executing in one or more particular execution modes. The processor 120 may determine whether it is executing in a secure enclave or whether it is executing in VMX-root mode (e.g., within a VMM). As another example, the computing device 100 may identify the programming TEE 314 based on the wrapped programming information, for example by examining the WRAPPING_TEE field of the BIND_STRUCT object, as described above. In block 516, the computing device 100 checks whether DMA channel programming is allowed. If not, the method 500 branches to block 512, in which the computing device 100 drops the programming request and logs an error as described above. If DMA channel programming is allowed, the method 500 branches to block 518.

In block 518, the computing device 100 proceeds with the DMA channel programming request. For example, as described above in connection with block 406 of FIG. 4, the processor 120 may proceed with generating the wrapped programming information. As another example, as described above in connection with block 416 of FIG. 4, the processor 120 and/or the cryptographic engine 140 may proceed with unwrapping the wrapped programming information and/or programming the DMA channel. After the DMA programming request is allowed, the state of the DMA channel may be changed, for example by bringing the DMA channel into secure operation or by bringing the DMA channel out of secure operation. After allowing the DMA channel programming, the method 500 loops back to block 506, in which the computing device 100 monitors for additional programming requests.

Figure 6:
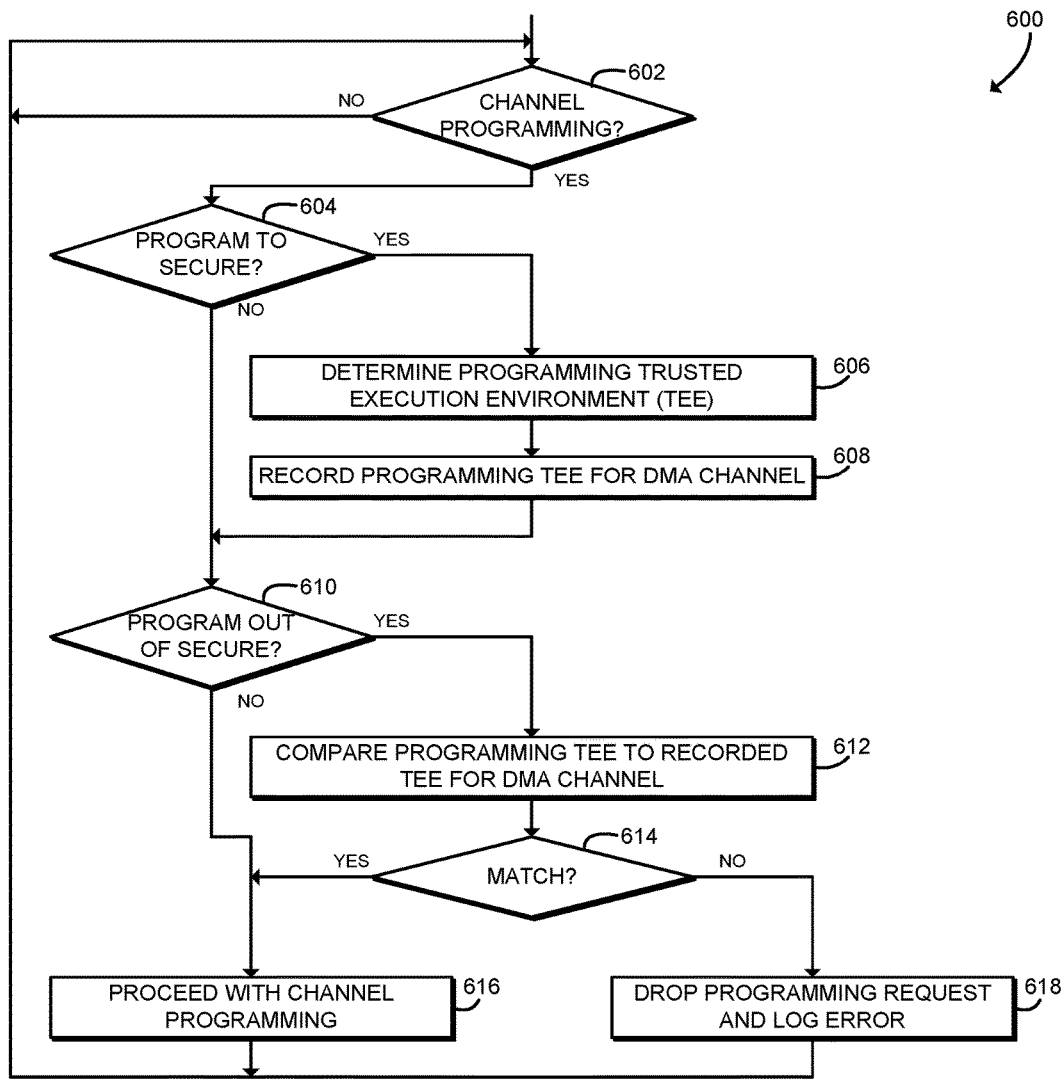
FIG. 6 is a simplified flow diagram of at least one embodiment of a method for ownership checking that may be executed by the computing device of FIGS. 1-2.

Referring now to FIG. 6, in use, the computing device 100 may execute a method 600 for DMA channel ownership checking. The method 600 may be executed by hardware, firmware, processor microcode, software, or other execution resources of the computing device 100. For example, in some embodiments, the method 600 may be executed by microcode of the processor 120 in response to invocation of the UNWRAP instruction as described above in connection with block 422 of FIG. 4. Additionally or alternatively, in some embodiments the method 600 may be executed by the cryptographic engine 140 in response to a programming attempt as described above in connection with block 422 of FIG. 4.

The method 600 begins in block 602, in which the computing device 100 determines whether DMA channel programming has been attempted. For example, the computing device 100 may determine whether untrusted software has requested unwrapping and/or programming of the wrapped programming information as described above in connection with block 416 of FIG. 4. If a channel programming attempt is not detected, the method 600 loops back to block 602 to continue monitoring for channel programming attempts. If a channel programming attempt is detected, the method 600 advances to block 604.

In block 604, the computing device 100 determines whether the channel programming request is a request to program the DMA channel to secure. The cryptographic engine 140 may support several programming commands, including programming a channel to secure, programming a channel out of secure, and other commands. The computing device 100 may examine the wrapped programming information to determine whether the TEE 314 has requested to program a DMA channel to secure. For example, the BIND_STRUCT object may include a one or more fields that includes the requested programming command. For example, one or more fields of the BIND_STRUCT object field may include a command to program a channel into secure or a command to program the channel out of secure. If the channel programming request is not a request to program the channel to secure, the method 600 branches ahead to block 610, described below. If the channel programming request is a request to program the channel to secure, the method 600 advances to block 606.

In block 606, the computing device 100 determines the trusted execution environment (TEE) 314 that originated the channel programming request. The computing device 100 may use any appropriate technique to identify the originating TEE 314. For example, the computing device 100 may identify the originating TEE 314 based on the wrapped programming information, for example by examining the WRAPPING_TEE field of the BIND_STRUCT object. In block 608, the computing device 100 records the identity of the originating TEE 314 associated with the DMA channel that is to be programmed into secure. The computing device 100 may use any technique to record the programming TEE 314. For example, the CID table 142 of the cryptographic engine 140 may include a field to identify the associated TEE 314 with every entry. As another example, the encryption key used to protect the DMA channel, which is a secret of the programming TEE 314, may be recorded to identify the associated TEE 314.

In block 610, the computing device 100 determines whether the channel programming request is a request to program a DMA channel out of secure. For example, the computing device 100 may determine whether the BIND_STRUCT object includes a request to unprotect a channel. If the programming request is not a request to program a DMA channel out of secure, the method 600 branches ahead to block 616, in which the computing device 100 proceeds with DMA channel programming. The computing device 100 may program the requested DMA channel to secure or perform any other requested command (e.g., reprogram channel with different key or query the channel key). For example, as described above in connection with block 416 of FIG. 4, the processor 120 and/or the cryptographic engine 140 may proceed with unwrapping the wrapped programming information and/or programming the DMA channel. After programming the DMA channel, the method 600 loops back to block 602 to continue monitoring for additional channel programming requests.

Referring back to block 610, if the programming request is a request to program the DMA channel out of secure, the method 600 branches ahead to block 612, in which the computing device 100 compares the programming TEE 314 to the recorded TEE 314 for the specified DMA channel. As described above in connection with block 608, when the DMA channel is originally programmed to secure, the computing device 100 stores the identity of the programming TEE 314. Thus, by comparing the programming TEE 314 of the request to program the DMA channel out of secure to the recorded TEE 314, the computing device 100 determines whether the same TEE 314 that programmed the DMA channel to secure is attempting to program the DMA channel out of secure. The computing device 100 may use any appropriate technique to compare the programming TEE 314 to the recorded TEE 314. For example, the computing device 100 may compare the programming TEE 314 to the identity of the TEE 314 recorded in the CID table 142 of the cryptographic engine 140 for the DMA channel. As another example, the computing device 100 may compare the channel programming key included in the request to unprotect the DMA channel to the encryption key currently stored in the CID table 142 and being used to protect the DMA channel.

In block 614, the computing device 100 determines whether the programming TEE 314 and the recorded TEE 314 match. If so, the method 600 branches to block 616, in which the computing device 100 proceeds with DMA channel programming. For example, as described above in connection with block 416 of FIG. 4, the processor 120 and/or the cryptographic engine 140 may proceed with unwrapping the wrapped programming information and/or programming the DMA channel out of secure. After programming the channel, the method 600 loops back to block 602 to continue monitoring for additional channel programming requests.

Referring back to block 614, if the programming TEE 314 and the recorded TEE 314 do not match, then the method 600 branches to block 618, in which the computing device 100 drops the programming request and logs an error. After dropping the programming request, the state of the associated DMA channel may remain unchanged. Thus, the DMA channel may remain protected from the programming TEE 314. After dropping the programming request, the method 600 loops back to block 602, in which the computing device 100 monitors for further channel programming requests.

It should be appreciated that, in some embodiments, the methods 400, 500, and/or 600, may be embodied as various instructions stored on a computer-readable media, which may be executed by the processor 120, the cryptographic engine 140, and/or other components of the computing device 100 to cause the computing device 100 to perform the corresponding method 400, 500, and/or 600. The computer-readable media may be embodied as any type of media capable of being read by the computing device 100 including, but not limited to, the memory 132, the data storage device 134, microcode of the processor 120, memory of the cryptographic engine 140, firmware of the cryptographic engine 140, and/or other media.

EXAMPLES

Illustrative examples of the technologies disclosed herein are provided below. An embodiment of the technologies may include any one or more, and any combination of, the examples described below.

Example 1 includes a computing device for secure cryptographic engine programming, the computing device comprising: a configuration module to request, by a trusted execution environment of the computing device, to program a cryptographic engine of the computing device to protect a direct memory access (DMA) channel; and a manifest verification module to: (i) verify a signed manifest of the computing device in response to a request to program the cryptographic engine, wherein the signed manifest is indicative of one or more trusted execution environments permitted to program DMA channels, (ii) determine, in response to verification of the signed manifest, whether the trusted execution environment is permitted to program the DMA channel based on the signed manifest, and (iii) program the DMA channel in response to a determination that the trusted execution environment is permitted to program the DMA channel.

Example 2 includes the subject matter of Example 1, and wherein the trusted execution environment comprises a secure enclave established with secure enclave support of a processor of the computing device or a virtual machine monitor.

Example 3 includes the subject matter of any of Examples 1 and 2, and wherein the manifest verification module is further to drop the request to program the cryptographic engine in response to a determination that the trusted execution environment is not permitted to program the DMA channel.

Example 4 includes the subject matter of any of Examples 1-3, and wherein the configuration module is further to securely provision the signed manifest to the computing device.

Example 5 includes the subject matter of any of Examples 1-4, and wherein: the configuration module is further to program an address of the signed manifest to the cryptographic engine; wherein to verify the signed manifest of the computing device comprises to read the signed manifest from the address of the signed manifest.

Example 6 includes the subject matter of any of Examples 1-5, and wherein to verify the signed manifest of the computing device comprises to verify the signed manifest using a manufacturer public key.

Example 7 includes the subject matter of any of Examples 1-6, and further comprising a processor, wherein: to request to program the cryptographic engine of the computing device to protect the DMA channel comprises to invoke a processor instruction to generate wrapped programming information; the processor comprises the manifest verification module; and to verify the signed manifest of the computing device comprises to verify the signed manifest in response invocation of the processor instruction.

Example 8 includes the subject matter of any of Examples 1-7, and wherein: to request to program the cryptographic engine of the computing device to protect the DMA channel comprises to invoke, by the trusted execution environment, a first processor instruction to generate wrapped programming information, wherein the wrapped programming information is indicative of the trusted execution environment; and to determine whether the trusted execution environment is permitted to program the DMA channel based on the signed manifest further comprises to determine the trusted execution environment based on the wrapped programming information.

Example 9 includes the subject matter of any of Examples 1-8, and further comprising a processor, wherein: to generate the request to program the cryptographic engine of the computing device to protect the DMA channel comprises to invoke, by untrusted software of the computing device, a second processor instruction with the wrapped programming information; and the processor comprises the manifest verification module.

Example 10 includes the subject matter of any of Examples 1-9, and wherein the cryptographic engine comprises the manifest verification module.

Example 11 includes a computing device for secure cryptographic engine programming, the computing device comprising: a configuration module to generate, by a trusted execution environment, a request to program a cryptographic engine of the computing device with respect to a direct memory access (DMA) channel; and an ownership verification module to: (i) determine whether the request to program the cryptographic engine comprises a request to program the DMA channel out of secure, (ii) determine whether the trusted execution environment matches a recorded trusted execution environment associated with the DMA channel in response to a determination that the request to program the cryptographic engine comprises a request to program the DMA channel out of secure, and (iii) allow the request to program the cryptographic engine in response to a determination that the trusted execution environment matches the recorded trusted execution environment associated with the DMA channel.

Example 12 includes the subject matter of Example 11, and wherein the trusted execution environment comprises a secure enclave established with secure enclave support of a processor of the computing device or a virtual machine monitor.

Example 13 includes the subject matter of any of Examples 11 and 12, and wherein the ownership verification module is further to drop the request to program the cryptographic engine in response to a determination that the trusted execution environment does not match the recorded trusted execution environment associated with the DMA channel.

Example 14 includes the subject matter of any of Examples 11-13, and wherein the ownership verification module is further to: determine whether the request to program the cryptographic engine comprises a request to program the DMA channel to secure; and record the trusted execution environment associated with the DMA channel in response to a determination that the request to program the cryptographic engine comprises a request to program the DMA channel to secure.

Example 15 includes the subject matter of any of Examples 11-14, and wherein the request to program the cryptographic engine comprises wrapped programming information indicative of the trusted execution environment.

Example 16 includes the subject matter of any of Examples 11-15, and wherein the cryptographic engine comprises the ownership verification module.

Example 17 includes the subject matter of any of Examples 11-16, and further comprising a processor, wherein the processor comprises the ownership verification module.

Example 18 includes the subject matter of any of Examples 11-17, and wherein: to generate the request to program the cryptographic engine comprises to: (i) invoke, by the trusted execution environment, a first processor instruction to generate wrapped programming information, wherein the wrapped programming information is indicative of the trusted execution environment and (ii) invoke, by untrusted software of the computing device, a second processor instruction with the wrapped programming information; and to determine whether the request to program the cryptographic engine comprises a request to program the DMA channel out of secure comprises to determine, by the processor in response to invocation of the second processor instruction, whether the request to program the cryptographic engine comprises a request to program the DMA channel out of secure.

Example 19 includes the subject matter of any of Examples 11-18, and wherein to determine whether the trusted execution environment matches the recorded trusted execution environment associated with the DMA channel comprises to compare a channel programming key associated with the request to program the cryptographic engine with an encryption key associated with the DMA channel.

Example 20 includes a method for secure cryptographic engine programming, the method comprising: generating, by a trusted execution environment of a computing device, a request to program a cryptographic engine of the computing device to protect a direct memory access (DMA) channel; verifying, by the computing device, a signed manifest of the computing device in response to generating the request to program the cryptographic engine, wherein the signed manifest is indicative of one or more trusted execution environments permitted to program DMA channels; determining, by the computing device in response to verifying the signed manifest, whether the trusted execution environment is permitted to program the DMA channel based on the signed manifest; and programming, by the computing device, the DMA channel in response to determining that the trusted execution environment is permitted to program the DMA channel.

Example 21 includes the subject matter of Example 20, and wherein the trusted execution environment comprises a secure enclave established with secure enclave support of a processor of the computing device or a virtual machine monitor.

Example 22 includes the subject matter of any of Examples 20 and 21, and further comprising dropping, by the computing device, the request to program the cryptographic engine in response to determining that the trusted execution environment is not permitted to program the DMA channel.

Example 23 includes the subject matter of any of Examples 20-22, and further comprising securely provisioning the signed manifest to the computing device.

Example 24 includes the subject matter of any of Examples 20-23, and further comprising: programming, by the computing device, an address of the signed manifest to the cryptographic engine; wherein verifying the signed manifest of the computing device comprises reading the signed manifest from the address of the signed manifest.

Example 25 includes the subject matter of any of Examples 20-24, and wherein verifying the signed manifest of the computing device comprises verifying the signed manifest using a manufacturer public key.

Example 26 includes the subject matter of any of Examples 20-25, and wherein: generating the request to program the cryptographic engine of the computing device to protect the DMA channel comprises invoking a processor instruction to generate wrapped programming information; verifying the signed manifest of the computing device comprises verifying the signed manifest by a processor of the computing device in response invoking the processor instruction; determining whether the trusted execution environment is permitted to program the DMA channel based on the system manifest comprises determining, by the processor, whether the trusted execution environment is permitted to program the DMA channel based on the system manifest; and programming the DMA channel in response to determining that the trusted execution environment is permitted to program the DMA channel comprises generating, by the processor, the wrapped programming information in response to determining that the trusted execution environment is permitted to program the DMA channel.

Example 27 includes the subject matter of any of Examples 20-26, and wherein: generating the request to program the cryptographic engine of the computing device to protect the DMA channel comprises invoking, by the trusted execution environment, a first processor instruction to generate wrapped programming information, wherein the wrapped programming information is indicative of the trusted execution environment; and determining whether the trusted execution environment is permitted to program the DMA channel based on the signed manifest further comprises determining the trusted execution environment based on the wrapped programming information.

Example 28 includes the subject matter of any of Examples 20-27, and wherein: generating the request to program the cryptographic engine of the computing device to protect the DMA channel comprises invoking, by untrusted software of the computing device, a second processor instruction with the wrapped programming information; verifying the signed manifest of the computing device comprises verifying the signed manifest by a processor of the computing device in response to invoking the second processor instruction; determining whether the trusted execution environment is permitted to program the DMA channel based on the system manifest comprises determining, by the processor, whether the trusted execution environment is permitted to program the DMA channel; and programming the DMA channel in response to determining that the trusted execution environment is permitted to program the DMA channel comprises programming, by the processor, the DMA channel in response to determining that the trusted execution environment is permitted to program the DMA channel.

Example 29 includes the subject matter of any of Examples 20-28, and wherein: verifying the signed manifest of the computing device comprises verifying the signed manifest by the cryptographic engine; determining whether the trusted execution environment is permitted to program the DMA channel based on the system manifest comprises determining, by the cryptographic engine, whether the trusted execution environment is permitted to program the DMA channel; and programming the DMA channel in response to determining that the trusted execution environment is permitted to program the DMA channel comprises programming, by the cryptographic engine, the DMA channel in response to determining that the trusted execution environment is permitted to program the DMA channel.

Example 30 includes a method for secure cryptographic engine programming, the method comprising: generating, by a trusted execution environment of a computing device, a request to program a cryptographic engine of the computing device with respect to a direct memory access (DMA) channel; determining, by the computing device, whether the request to program the cryptographic engine comprises a request to program the DMA channel out of secure; determining, by the computing device, whether the trusted execution environment matches a recorded trusted execution environment associated with the DMA channel in response to determining that the request to program the cryptographic engine comprises a request to program the DMA channel out of secure; and allowing, by the computing device, the request to program the cryptographic engine in response to determining that the trusted execution environment matches the recorded trusted execution environment associated with the DMA channel.

Example 31 includes the subject matter of Example 30, and wherein the trusted execution environment comprises a secure enclave established with secure enclave support of a processor of the computing device or a virtual machine monitor.

Example 32 includes the subject matter of any of Examples 30 and 31, and further comprising dropping, by the computing device, the request to program the cryptographic engine in response to determining that the trusted execution environment does not match the recorded trusted execution environment associated with the DMA channel.

Example 33 includes the subject matter of any of Examples 30-32, and further comprising: determining, by the computing device, whether the request to program the cryptographic engine comprises a request to program the DMA channel to secure; and recording, by the computing device, the trusted execution environment associated with the DMA channel in response to determining that the request to program the cryptographic engine comprises a request to program the DMA channel to secure.

Example 34 includes the subject matter of any of Examples 30-33, and wherein generating the request to program the cryptographic engine comprises generating wrapped programming information indicative of the trusted execution environment.

Example 35 includes the subject matter of any of Examples 30-34, and wherein: determining whether the request to program the cryptographic engine comprises a request to program the DMA channel out of secure comprises determining, by the cryptographic engine, whether the request to program the cryptographic engine comprises a request to program the DMA channel out of secure; determining whether the trusted execution environment matches the recorded trusted execution environment comprises determining, by the cryptographic engine, whether the trusted execution environment matches the recorded trusted execution environment; and allowing the request to program the cryptographic engine comprises allowing, by the cryptographic engine, the request to program the cryptographic engine.

Example 36 includes the subject matter of any of Examples 30-35, and wherein: determining whether the request to program the cryptographic engine comprises a request to program the DMA channel out of secure comprises determining, by a processor of the computing device, whether the request to program the cryptographic engine comprises a request to program the DMA channel out of secure; determining whether the trusted execution environment matches the recorded trusted execution environment comprises determining, by the processor, whether the trusted execution environment matches the recorded trusted execution environment; and allowing the request to program the cryptographic engine comprises allowing, by the processor, the request to program the cryptographic engine.

Example 37 includes the subject matter of any of Examples 30-36, and wherein: generating the request to program the cryptographic engine comprises: (i) invoking, by the trusted execution environment, a first processor instruction to generate wrapped programming information, wherein the wrapped programming information is indicative of the trusted execution environment and (ii) invoking, by untrusted software of the computing device, a second processor instruction with the wrapped programming information; and determining whether the request to program the cryptographic engine comprises a request to program the DMA channel out of secure comprises determining, by the processor in response to invoking the second processor instruction, whether the request to program the cryptographic engine comprises a request to program the DMA channel out of secure.

Example 38 includes the subject matter of any of Examples 30-37, and wherein determining whether the trusted execution environment matches the recorded trusted execution environment associated with the DMA channel comprises comparing a channel programming key associated with the request to program the cryptographic engine with an encryption key associated with the DMA channel.

Example 39 includes a computing device comprising: a processor; and a memory having stored therein a plurality of instructions that when executed by the processor cause the computing device to perform the method of any of Examples 20-38.

Example 40 includes one or more machine readable storage media comprising a plurality of instructions stored thereon that in response to being executed result in a computing device performing the method of any of Examples 20-38.

Example 41 includes a computing device comprising means for performing the method of any of Examples 20-38.

Example 42 includes a computing device for secure cryptographic engine programming, the computing device comprising: means for generating, by a trusted execution environment of the computing device, a request to program a cryptographic engine of the computing device to protect a direct memory access (DMA) channel; means for verifying a signed manifest of the computing device in response to generating the request to program the cryptographic engine, wherein the signed manifest is indicative of one or more trusted execution environments permitted to program DMA channels; means for determining, in response to verifying the signed manifest, whether the trusted execution environment is permitted to program the DMA channel based on the signed manifest; and means for programming the DMA channel in response to determining that the trusted execution environment is permitted to program the DMA channel.

Example 43 includes the subject matter of Example 42, and wherein the trusted execution environment comprises a secure enclave established with secure enclave support of a processor of the computing device or a virtual machine monitor.

Example 44 includes the subject matter of any of Examples 42 and 43, and further comprising means for dropping the request to program the cryptographic engine in response to determining that the trusted execution environment is not permitted to program the DMA channel.

Example 45 includes the subject matter of any of Examples 42-44, and further comprising means for securely provisioning the signed manifest to the computing device.

Example 46 includes the subject matter of any of Examples 42-45, and further comprising: means for programming an address of the signed manifest to the cryptographic engine; wherein the means for verifying the signed manifest of the computing device comprises means for reading the signed manifest from the address of the signed manifest.

Example 47 includes the subject matter of any of Examples 42-46, and wherein the means for verifying the signed manifest of the computing device comprises means for verifying the signed manifest using a manufacturer public key.

Example 48 includes the subject matter of any of Examples 42-47, and wherein: the means for generating the request to program the cryptographic engine of the computing device to protect the DMA channel comprises means for invoking a processor instruction to generate wrapped programming information; the means for verifying the signed manifest of the computing device comprises means for verifying the signed manifest by a processor of the computing device in response invoking the processor instruction; the means for determining whether the trusted execution environment is permitted to program the DMA channel based on the system manifest comprises means for determining, by the processor, whether the trusted execution environment is permitted to program the DMA channel based on the system manifest; and the means for programming the DMA channel in response to determining that the trusted execution environment is permitted to program the DMA channel comprises means for generating, by the processor, the wrapped programming information in response to determining that the trusted execution environment is permitted to program the DMA channel.

Example 49 includes the subject matter of any of Examples 42-48, and wherein: the means for generating the request to program the cryptographic engine of the computing device to protect the DMA channel comprises means for invoking, by the trusted execution environment, a first processor instruction to generate wrapped programming information, wherein the wrapped programming information is indicative of the trusted execution environment; and the means for determining whether the trusted execution environment is permitted to program the DMA channel based on the signed manifest further comprises means for determining the trusted execution environment based on the wrapped programming information.

Example 50 includes the subject matter of any of Examples 42-49, and wherein: the means for generating the request to program the cryptographic engine of the computing device to protect the DMA channel comprises means for invoking, by untrusted software of the computing device, a second processor instruction with the wrapped programming information; the means for verifying the signed manifest of the computing device comprises means for verifying the signed manifest by a processor of the computing device in response to invoking the second processor instruction; the means for determining whether the trusted execution environment is permitted to program the DMA channel based on the system manifest comprises means for determining, by the processor, whether the trusted execution environment is permitted to program the DMA channel; and the means for programming the DMA channel in response to determining that the trusted execution environment is permitted to program the DMA channel comprises means for programming, by the processor, the DMA channel in response to determining that the trusted execution environment is permitted to program the DMA channel.

Example 51 includes the subject matter of any of Examples 42-50, and wherein: the means for verifying the signed manifest of the computing device comprises means for verifying the signed manifest by the cryptographic engine; the means for determining whether the trusted execution environment is permitted to program the DMA channel based on the system manifest comprises means for determining, by the cryptographic engine, whether the trusted execution environment is permitted to program the DMA channel; and the means for programming the DMA channel in response to determining that the trusted execution environment is permitted to program the DMA channel comprises means for programming, by the cryptographic engine, the DMA channel in response to determining that the trusted execution environment is permitted to program the DMA channel.

Example 52 includes a computing device for secure cryptographic engine programming, the computing device comprising: means for generating, by a trusted execution environment of the computing device, a request to program a cryptographic engine of the computing device with respect to a direct memory access (DMA) channel; means for determining whether the request to program the cryptographic engine comprises a request to program the DMA channel out of secure; means for determining whether the trusted execution environment matches a recorded trusted execution environment associated with the DMA channel in response to determining that the request to program the cryptographic engine comprises a request to program the DMA channel out of secure; and means for allowing the request to program the cryptographic engine in response to determining that the trusted execution environment matches the recorded trusted execution environment associated with the DMA channel.

Example 53 includes the subject matter of Example 52, and wherein the trusted execution environment comprises a secure enclave established with secure enclave support of a processor of the computing device or a virtual machine monitor.

Example 54 includes the subject matter of any of Examples 52 and 53, and further comprising means for dropping the request to program the cryptographic engine in response to determining that the trusted execution environment does not match the recorded trusted execution environment associated with the DMA channel.

Example 55 includes the subject matter of any of Examples 52-54, and further comprising: means for determining whether the request to program the cryptographic engine comprises a request to program the DMA channel to secure; and means for recording the trusted execution environment associated with the DMA channel in response to determining that the request to program the cryptographic engine comprises a request to program the DMA channel to secure.

Example 56 includes the subject matter of any of Examples 52-55, and wherein the means for generating the request to program the cryptographic engine comprises means for generating wrapped programming information indicative of the trusted execution environment.

Example 57 includes the subject matter of any of Examples 52-56, and wherein: the means for determining whether the request to program the cryptographic engine comprises a request to program the DMA channel out of secure comprises means for determining, by the cryptographic engine, whether the request to program the cryptographic engine comprises a request to program the DMA channel out of secure; the means for determining whether the trusted execution environment matches the recorded trusted execution environment comprises means for determining, by the cryptographic engine, whether the trusted execution environment matches the recorded trusted execution environment; and the means for allowing the request to program the cryptographic engine comprises means for allowing, by the cryptographic engine, the request to program the cryptographic engine.

Example 58 includes the subject matter of any of Examples 52-57, and wherein: the means for determining whether the request to program the cryptographic engine comprises a request to program the DMA channel out of secure comprises means for determining, by a processor of the computing device, whether the request to program the cryptographic engine comprises a request to program the DMA channel out of secure; the means for determining whether the trusted execution environment matches the recorded trusted execution environment comprises means for determining, by the processor, whether the trusted execution environment matches the recorded trusted execution environment; and the means for allowing the request to program the cryptographic engine comprises means for allowing, by the processor, the request to program the cryptographic engine.

Example 59 includes the subject matter of any of Examples 52-58, and wherein: the means for generating the request to program the cryptographic engine comprises: (i) means for invoking, by the trusted execution environment, a first processor instruction to generate wrapped programming information, wherein the wrapped programming information is indicative of the trusted execution environment and (ii) means for invoking, by untrusted software of the computing device, a second processor instruction with the wrapped programming information; and the means for determining whether the request to program the cryptographic engine comprises a request to program the DMA channel out of secure comprises means for determining, by the processor in response to invoking the second processor instruction, whether the request to program the cryptographic engine comprises a request to program the DMA channel out of secure.

Example 60 includes the subject matter of any of Examples 52-59, and wherein the means for determining whether the trusted execution environment matches the recorded trusted execution environment associated with the DMA channel comprises means for comparing a channel programming key associated with the request to program the cryptographic engine with an encryption key associated with the DMA channel.

The invention claimed is:

1. A computing device for secure cryptographic engine programming, the computing device comprising:
  a configuration module to request, by a trusted execution environment of the computing device, to program a cryptographic engine of the computing device to protect a direct memory access (DMA) channel, wherein to program the cryptographic engine of the computing device to protect the DMA channel comprises to invoke, by the trusted execution environment, a first processor instruction to generate wrapped programming information indicative of the trusted execution environment; and
  a manifest verification module to: (i) verify a signed manifest of the computing device in response to a request to program the cryptographic engine, wherein the signed manifest is indicative of one or more trusted execution environments permitted to program DMA channels, (ii) determine, in response to verification of the signed manifest, whether the trusted execution environment is permitted to program the DMA channel based on the signed manifest, wherein to determine whether the trusted execution environment is permitted to program the DMA channel based on the signed manifest further comprises to determine the trusted execution environment based on the wrapped programming information, and (iii) program the DMA channel with respect to the cryptographic engine in response to a determination that the trusted execution environment is permitted to program the DMA channel.

2. The computing device of claim 1, wherein the trusted execution environment comprises a secure enclave established with secure enclave support of a processor of the computing device or a virtual machine monitor.

3. The computing device of claim 1, further comprising a processor, wherein:
  to request to program the cryptographic engine of the computing device to protect the DMA channel comprises to invoke a processor instruction to generate wrapped programming information;
  the processor comprises the manifest verification module; and
  to verify the signed manifest of the computing device comprises to verify the signed manifest in response invocation of the processor instruction.

4. The computing device of claim 1, further comprising a processor, wherein:
  to generate the request to program the cryptographic engine of the computing device to protect the DMA channel comprises to invoke, by untrusted software of the computing device, a second processor instruction with the wrapped programming information; and
  the processor comprises the manifest verification module.

5. The computing device of claim 1, wherein the cryptographic engine comprises the manifest verification module.

6. One or more non-transitory, machine readable storage media comprising a plurality of instructions that in response to being executed cause a computing device to:
  generate, by a trusted execution environment of the computing device, a request to program a cryptographic engine of the computing device to protect a direct memory access (DMA) channel, wherein to program the cryptographic engine of the computing device to protect the DMA channel comprises to invoke, by the trusted execution environment, a first processor instruction to generate wrapped programming information indicative of the trusted execution environment;
  verify a signed manifest of the computing device in response to generating the request to program the cryptographic engine, wherein the signed manifest is indicative of one or more trusted execution environments permitted to program DMA channels;
  determine, in response to verifying the signed manifest, whether the trusted execution environment is permitted to program the DMA channel based on the signed manifest, wherein to determine whether the trusted execution environment is permitted to program the DMA channel based on the signed manifest further comprises to determine the trusted execution environment based on the wrapped programming information; and
  program the DMA channel with respect to the cryptographic engine in response to determining that the trusted execution environment is permitted to program the DMA channel.

7. The one or more non-transitory, machine readable storage media of claim 6, wherein the trusted execution environment comprises a secure enclave established with secure enclave support of a processor of the computing device or a virtual machine monitor.

8. The one or more non-transitory machine readable storage media of claim 6, wherein:
  to generate the request to program the cryptographic engine of the computing device to protect the DMA channel comprises to invoke a processor instruction to generate wrapped programming information;
  to verify the signed manifest of the computing device comprises to verify the signed manifest by a processor of the computing device in response invoking the processor instruction;
  to determine whether the trusted execution environment is permitted to program the DMA channel based on the system manifest comprises to determine, by the processor, whether the trusted execution environment is permitted to program the DMA channel based on the system manifest; and
  to program the DMA channel in response to determining that the trusted execution environment is permitted to program the DMA channel comprises to generate, by the processor, the wrapped programming information in response to determining that the trusted execution environment is permitted to program the DMA channel.

9. The one or more non-transitory, machine readable storage media of claim 6, wherein:
  to generate the request to program the cryptographic engine of the computing device to protect the DMA channel comprises to invoke, by the trusted execution environment, a first processor instruction to generate wrapped programming information, wherein the wrapped programming information is indicative of the trusted execution environment; and
  to determine whether the trusted execution environment is permitted to program the DMA channel based on the signed manifest further comprises to determine the trusted execution environment based on the wrapped programming information.

10. The one or more non-transitory, machine readable storage media of claim 9, wherein:

to generate the request to program the cryptographic engine of the computing device to protect the DMA channel comprises to invoke, by untrusted software of the computing device, a second processor instruction with the wrapped programming information;

to verify the signed manifest of the computing device comprises to verify the signed manifest by a processor of the computing device in response to invoking the second processor instruction;

to determine whether the trusted execution environment is permitted to program the DMA channel based on the system manifest comprises to determine, by the processor, whether the trusted execution environment is permitted to program the DMA channel; and to program the DMA channel in response to determining that the trusted execution environment is permitted to program the DMA channel comprises to program, by the processor, the DMA channel in response to determining that the trusted execution environment is permitted to program the DMA channel.

11. The one or more non-transitory, machine readable storage media of claim 9, wherein:

to verify the signed manifest of the computing device comprises to verify the signed manifest by the cryptographic engine;

to determine whether the trusted execution environment is permitted to program the DMA channel based on the system manifest comprises to determine, by the cryptographic engine, whether the trusted execution environment is permitted to program the DMA channel; and to program the DMA channel in response to determining that the trusted execution environment is permitted to program the DMA channel comprises to program, by the cryptographic engine, the DMA channel in response to determining that the trusted execution environment is permitted to program the DMA channel.

12. A computing device for secure cryptographic engine programming, the computing device comprising:

a configuration module to generate, by a trusted execution environment, a request to program a cryptographic engine of the computing device with respect to a direct memory access (DMA) channel, wherein to generate the request to program the cryptographic engine comprises to: (i) invoke, by the trusted execution environment, a first processor instruction to generate wrapped programming information, wherein the wrapped programming information is indicative of the trusted execution environment and (ii) invoke, by untrusted software of the computing device, a second processor instruction with the wrapped programming information; and an ownership verification module to: (i) determine whether the request to program the cryptographic engine comprises a request to program the DMA channel out of secure, (ii) determine whether the trusted execution environment matches a recorded trusted execution environment associated with the DMA channel in response to a determination that the request to program the cryptographic engine comprises a request to program the DMA channel out of secure, to determine whether the request to program the cryptographic engine comprises a request to program the DMA channel out of secure comprises to determine, by the processor in response to invocation of the second processor instruction, whether the request to program the cryptographic engine comprises a request to program the DMA channel out of secure and (iii) allow the request to program the cryptographic engine in response to a determination that the trusted execution environment matches the recorded trusted execution environment associated with the DMA channel.

13. The computing device of claim 12, wherein the trusted execution environment comprises a secure enclave established with secure enclave support of a processor of the computing device or a virtual machine monitor.

14. The computing device of claim 12, wherein the request to program the cryptographic engine comprises wrapped programming information indicative of the trusted execution environment.

15. The computing device of claim 12, wherein the cryptographic engine comprises the ownership verification module.

16. The computing device of claim 12, further comprising a processor, wherein the processor comprises the ownership verification module.

17. The computing device of claim 12, wherein to determine whether the trusted execution environment matches the recorded trusted execution environment associated with the DMA channel comprises to compare a channel programming key associated with the request to program the cryptographic engine with an encryption key associated with the DMA channel.

18. One or more non-transitory, machine readable storage media comprising a plurality of instructions that in response to being executed cause a computing device to:

generate, by a trusted execution environment of the computing device, a request to program a cryptographic engine of the computing device with respect to a direct memory access (DMA) channel, wherein to generate the request to program the cryptographic engine comprises to: (i) invoke, by the trusted execution environment, a first processor instruction to generate wrapped programming information, wherein the wrapped programming information is indicative of the trusted execution environment and (ii) invoke, by untrusted software of the computing device, a second processor instruction with the wrapped programming information;

determine whether the request to program the cryptographic engine comprises a request to program the DMA channel out of secure;

determine whether the trusted execution environment matches a recorded trusted execution environment associated with the DMA channel in response to determining that the request to program the cryptographic engine comprises a request to program the DMA channel out of secure, wherein to determine whether the request to program the cryptographic engine comprises a request to program the DMA channel out of secure comprises to determine, by the processor in response to invocation of the second processor instruction, whether the request to program the cryptographic engine comprises a request to program the DMA channel out of secure; and allow the request to program the cryptographic engine in response to determining that the trusted execution environment matches the recorded trusted execution environment associated with the DMA channel.

19. The one or more non-transitory, machine readable storage media of claim 18, wherein the trusted execution environment comprises a secure enclave established with secure enclave support of a processor of the computing device or a virtual machine monitor.

20. The one or more non-transitory, machine readable storage media of claim 18, wherein:
- to determine whether the request to program the cryptographic engine comprises a request to program the DMA channel out of secure comprises to determine, by the cryptographic engine, whether the request to program the cryptographic engine comprises a request to program the DMA channel out of secure;
- to determine whether the trusted execution environment matches the recorded trusted execution environment comprises to determine, by the cryptographic engine, whether the trusted execution environment matches the recorded trusted execution environment; and
- to allow the request to program the cryptographic engine comprises to allow, by the cryptographic engine, the request to program the cryptographic engine.

21. The one or more non-transitory, machine readable storage media of claim 18, wherein:
- to determine whether the request to program the cryptographic engine comprises a request to program the DMA channel out of secure comprises to determine, by a processor of the computing device, whether the request to program the cryptographic engine comprises a request to program the DMA channel out of secure;
- to determine whether the trusted execution environment matches the recorded trusted execution environment comprises to determine, by the processor, whether the trusted execution environment matches the recorded trusted execution environment; and
- to allow the request to program the cryptographic engine comprises to allow, by the processor, the request to program the cryptographic engine.

* * * * *